Aug. 14, 1923.
G. R. YOUNG
PROCESS OF SEPARATING
Filed Oct. 17, 1919
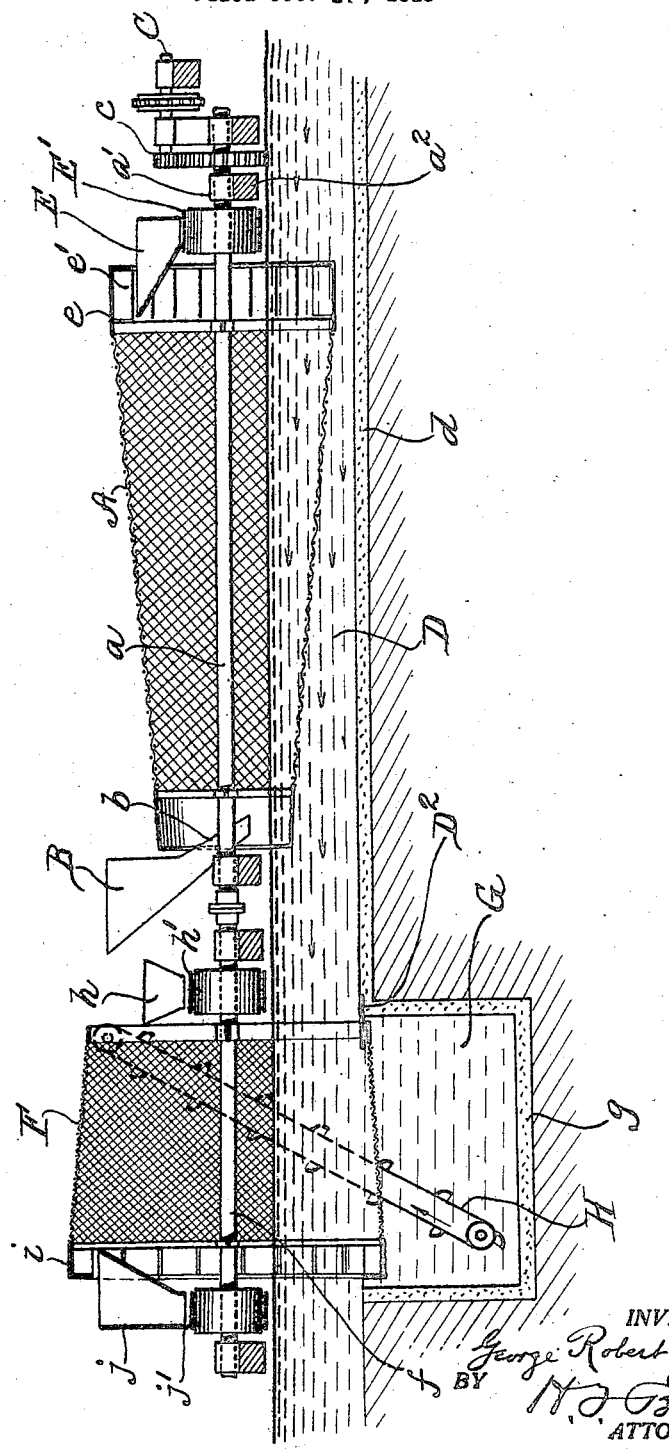
INVENTOR.
George Robert Young
BY
ATTORNEYS.

Patented Aug. 14, 1923.

1,465,010

UNITED STATES PATENT OFFICE.

GEORGE ROBERT YOUNG, OF HUNTINGTON, NEW YORK, ASSIGNOR, BY MESNE ASSIGNMENTS, TO YOUNG SAND AND GRAVEL CORPORATION, OF NEW YORK, N. Y., A CORPORATION OF NEW YORK.

PROCESS OF SEPARATING.

Application filed October 17, 1919. Serial No. 331,440.

*To all whom it may concern:*

Be it known that I, GEORGE ROBERT YOUNG, a subject of the British Empire (who has declared his intention of becoming a citizen of the United States), residing at Huntington, county of Suffolk, and State of New York, have invented a certain new and useful Process of Separating, of which the following is a specification.

This invention is a process of separating materials combined in a natural state, and it pertains, more particularly, to the separation of sand and grit from gravel and from each other, whereby the separated materials are rendered available individually for use in the industrial arts.

In the present invention it is sought to subject large masses, or relatively large masses, to such treatment as will effect in a rapid, economical and thorough manner the separation of gravel from the sand and grit and will separate also the sand from the grit, whereby the three specified materials (gravel, sand and grit) are accumulated in separated masses to the end that each may be transported or utilized independently of the others.

According to this invention the separation is effected by subjecting the materials to a conjoint screening and hydraulic action at successive stages, the procedure involving the washing of the gravel and the individual collection of such gravel as the first step in the treatment, and thereafter the grit and sand are in an analogous manner exposed to a conjoint screening and hydraulic action in order to complete the separating operation thereby accumulating the grit in one mass and the grit and the sand in distinctly separate masses, whereby the gravel, grit and sand are collected in individual masses.

The process of my invention may be practised manually and hydraulically, but is most economically carried out by the aid of certain mechanical appliances one form of which is shown diagrammatically in the accompanying drawing and illustrated in detail in a separate application for a particular form of apparatus, the latter being claimed in said separate application, whereas the novel procedure or method constitutes the subject of the present application.

In the drawing, the figure is a more or less diagrammatic view showing certain parts in side elevation and other parts in longitudinal section.

The material in a natural state is supplied to a screening mechanism A by suitable means, such as a hopper B provided with a spout $b$ extending into the feeding end portion of said screen A. The screen is constructed of foraminous material the meshes of which are of such size that the sand and grit are free to pass through the same, whereas the gravel or coarse mineral aggregate is retained within the screen. Said screen is, preferably, of the rotary conical type, carried by a shaft $a$, supported in appropriate bearings $a'$ on a suitable frame $a^2$, motion being communicated to said screen from any suitable source, as e. g. by the intermeshing gears $c$ driven by a power shaft C.

The material supplied to the screen is subjected to mechanical agitation and hydraulic action conjointly applied, whereby the gravel is washed so as to free it from the sand and grit naturally adherent thereto. The hydraulic action is obtained by flowing liquid, usually water, through and within the screen, and at the same time the mass is agitated by rotary motion applied to the screen. To these ends, the screen cylinder is partially submerged in the water flowing within a water course or channel D, the latter being either a natural water course, such as a running stream, or an artificial channel, the latter being shown in the drawing as having a bed $d$ composed of concrete or other material. The water in the required volume and at the proper velocity flows in one direction, as indicated by the arrows, and in the form of screen shown, the under submerged surface thereof is inclined in a direction opposite to the line of flow of the water, so that the material lodging upon the screen is exposed by the agitation to which the material is subjected to the action of the water, the rotary motion of the screen and the inclination of its under submerged surface tending to feed the gravel toward the larger end of said screen. The sand and grit are carried by flotation through the meshes of the screen, whereas the gravel is collected in an imperforate section $e$ at the larger end of the screen, said gravel being elevated by the action of buckets $e'$ provided upon the inner surface of the imperforate member $e$. The gravel thus elevated is deposited into a hopper E, by which it is fed to a conveyer E', the latter operating to transport the accumulated gravel to a suitable pit or other place of deposit.

The sand and grit is carried with the water through the course or channel D, and are delivered into a second screen F, for the purpose of subjecting the same to a second conjoint screening and separating operation. Said screen F is carried by a shaft $f$ to support it over or within a collecting chamber G, the latter being in communication with the course or channel D and the bottom $g$ of which chamber is in a plane below the bed $d$. The second screen is provided with foraminous material, the mesh of which acts to retain the grit within the screen whereas the sand is free to pass through said mesh and to become precipitated within the chamber G. In the form shown, the screen F is tapering, said screen being supported in a manner for its under surface to extend to a considerable distance below the normal level of the water over the chamber, said under surface of the screen being at an angle of inclination to the normal water level and the direction of inclination being opposite to that of the first screen A. The tapering screen F is positioned for its open receiving end to be adjacent the level of the bed $d$ in order that the sand and grit carried by the flow of the water will pass into the screen. The sand and grit are agitated by the rotary motion of the screen in order to mechanically separate the sand from the grit, the flow of water through or within the screen tending to facilitate the separation and to attain maximum efficiency of operation. The sand accumulates within the chamber G, from whence the sand is removed by suitable means, a bucket elevator H being shown, the same operating to deposit the sand into a hopper $h$, below which operates a conveyer $h'$ whereby the sand is carried to a suitable place of deposit.

The grit flows into an imperforate member $i$ of the screen F, said member being provided with buckets $i'$ which on the rotary motion of the screen elevates the accumulated grit and deposits the same into a hopper $j$, beneath which operates a suitable carrier $j'$ for the purpose of discharging the grit material into a pile which is separate from the accumulations of gravel and sand.

By my invention the material in a natural state is subjected to treatment in a continuous manner for effecting the separation of gravel from the sand and grit, thereafter the sand is separated from the grit, and the different materials are carried to separate places of deposit. The procedure utilizes a mechanical screening operation in conjunction with hydraulic treatment so as to handle large masses of material in a rapid and efficient manner without requiring manual attendance or labor, to the end that economy is attained.

In a practical form of apparatus, it is desirable to preclude the sand and grit carried by the current flowing within the channel from passing directly into the chamber or pit, and to this end I provide a baffle $D^2$, shown in the drawing as a plate attached to the bed of the channel or course. Said plate extends across the space intervening the end of the channel or course and the chamber, the said plate projecting into the second screen and operating to direct the lower strata of sand and grit into said screen, whereby the baffle tends to contribute to the delivery of the sand and grit so as to insure that these materials will be subjected to a second screening action.

In addition to the functions hereinbefore recited, the flow of water within the first screen acts to carry off any branches or roots of trees, or other foreign matter, that may be present in the natural material when it is excavated and thereafter supplied to the first screen. It is to be observed that the inlet end of said first screen is below the normal water level flowing within the channel, and that the water flows out of said inlet end. It has been observed that the natural material frequently contains dirt and more or less vegetable matter, such as the roots or branches of trees. Ordinarily, the hydraulic separation of gravel from the other materials is carried on under such conditions that the roots and vegetable matter remain in the gravel, reducing the value of the gravel as a marketable product. In my invention, however, this condition is eliminated. The agitation of the natural material by the rotary motion of the first screen and the flow of water in one direction while the gravel travels in a contrary direction, tends to free the branches, roots and other vegetable matter from the gravel, as a result of which the branches, roots and vegetable matter will float on the surface of the water and thus be carried out of the first screen, through the channel, and also through the second screen, whereby the vegetable matter is separated from the sand, gravel and grit so as to be discharged with the flowing water, and the gravel is delivered in a clean condition to a point at one side of the water course, it being noted that the dirt is washed out of the gravel, sand and grit and floats away with the flowing water.

Having thus fully described the invention, what I claim as new, and desire to secure by Letters Patent is:

1. In the art of separating materials, the process which consists in subjecting the material to agitation within a screening mechanism and concurrently therewith exposing the materials to the flow of a liquid current for effecting the flotation of the sand and grit away from the gravel.

2. In the art of separating materials, the process which consists in screening the material and concurrently therewith subjecting the materials to the flow of a current of liquid acting to wash the sand and grit from contact with the gravel and by flotation to carry off the sand and grit from the presence of the washed gravel.

3. In the art of separating materials, the process which consists in subjecting the materials to successive screening actions, and concurrently therewith floating the sand and grit from the gravel and also floating the grit from the sand by the flow of a hydraulic current into contact with the materials while the latter are in a state of agitation due to the action of the screening mechanisms.

4. In the art of separating sand from gravel and grit, the process which consists in screening the mass of material and concurrently therewith subjecting the same while in a state of agitation to a current of water flowing in a direction to carry off the sand and grit from the gravel, and subsequently exposing a mass of sand and grit to a second screening action and concurrently therewith subjecting the mass while agitated to the flow of the water current.

5. In the art of separating sand from gravel and grit, the process which consists, first, in screening the mass and subjecting it while in a state of agitation to the flow of water; second, carrying the sand and grit by flotation away from the gravel, and, third, subjecting the mass of sand and grit to a second screening and while in a state of agitation flowing a current of water into contact therewith for effecting the separation of the sand from the grit.

6. In the art of separating sand from gravel and grit, the process which consists in screening the mass and concurrently therewith subjecting it to the flow of water thereby washing the sand and grit from contact with the gravel, carrying the sand and grit by the flow of the water from the vicinity of the gravel; again screening the mass of sand and grit and concurrently therewith subjecting the mass while agitated to the flow of the water, thereby separating the sand from the grit, and separately conveying the accumulated masses of gravel, grit and sand to points exterior to the path of flow of the water.

7. In the art of separating gravel from sand, grit and foreign matter, the process which consists in screening the mass of material while exposed to the action of a current of water flowing into contact with said mass while in a state of agitation, and by flotation carrying off the sand and grit and concurrently therewith eliminating the foreign matter by the flow of said water current.

In testimony whereof I have hereunto subscribed my name this 14th day of October, 1919.

GEORGE ROBERT YOUNG.